Oct. 23, 1962
M. J. LANE
3,059,689
STRIPPER COLLAR FOR FLARING MANDRELS
Filed Dec. 24, 1958
3 Sheets-Sheet 3
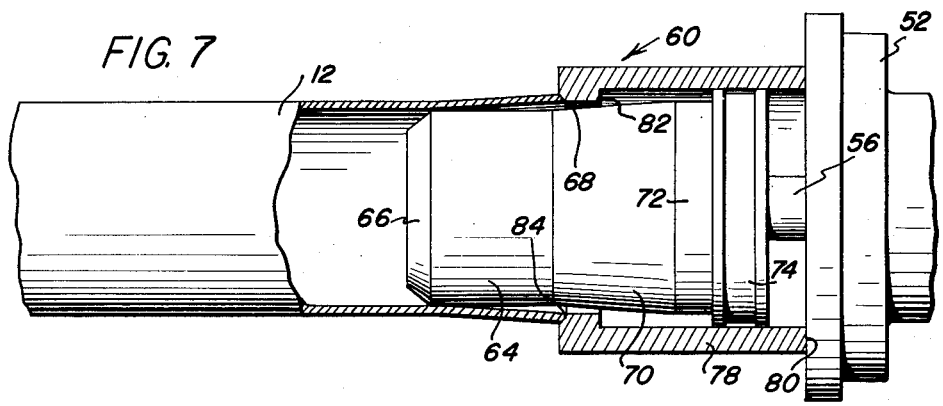
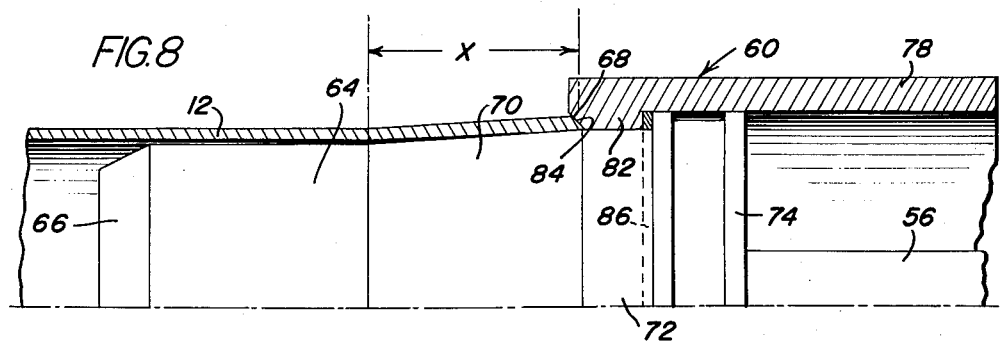
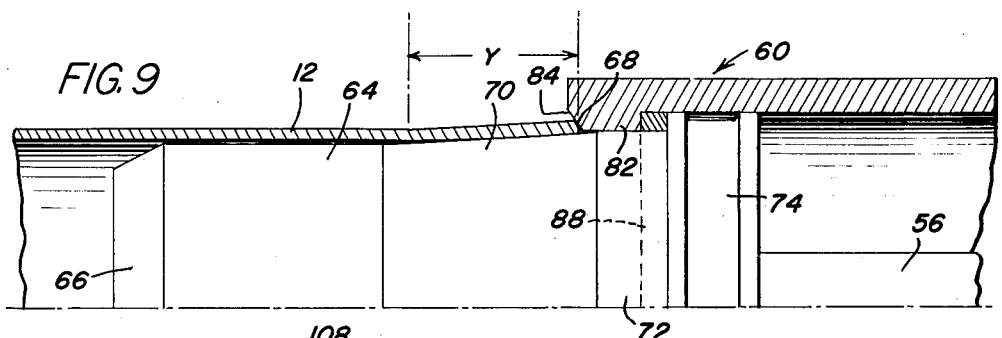
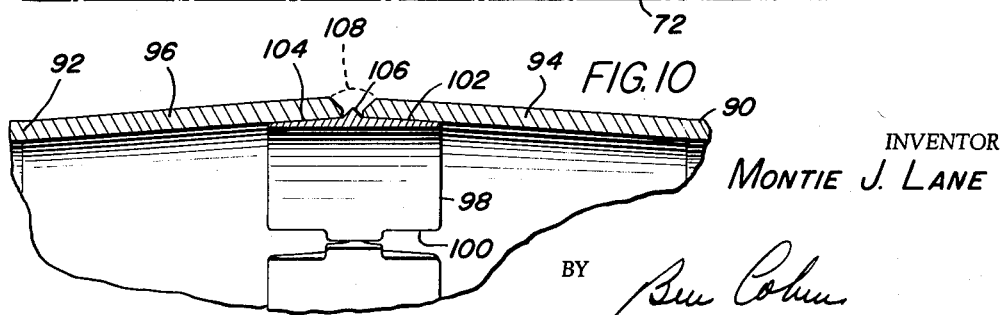
INVENTOR
MONTIE J. LANE
BY
ATTORNEY × # United States Patent Office 3,059,689
Patented Oct. 23, 1962

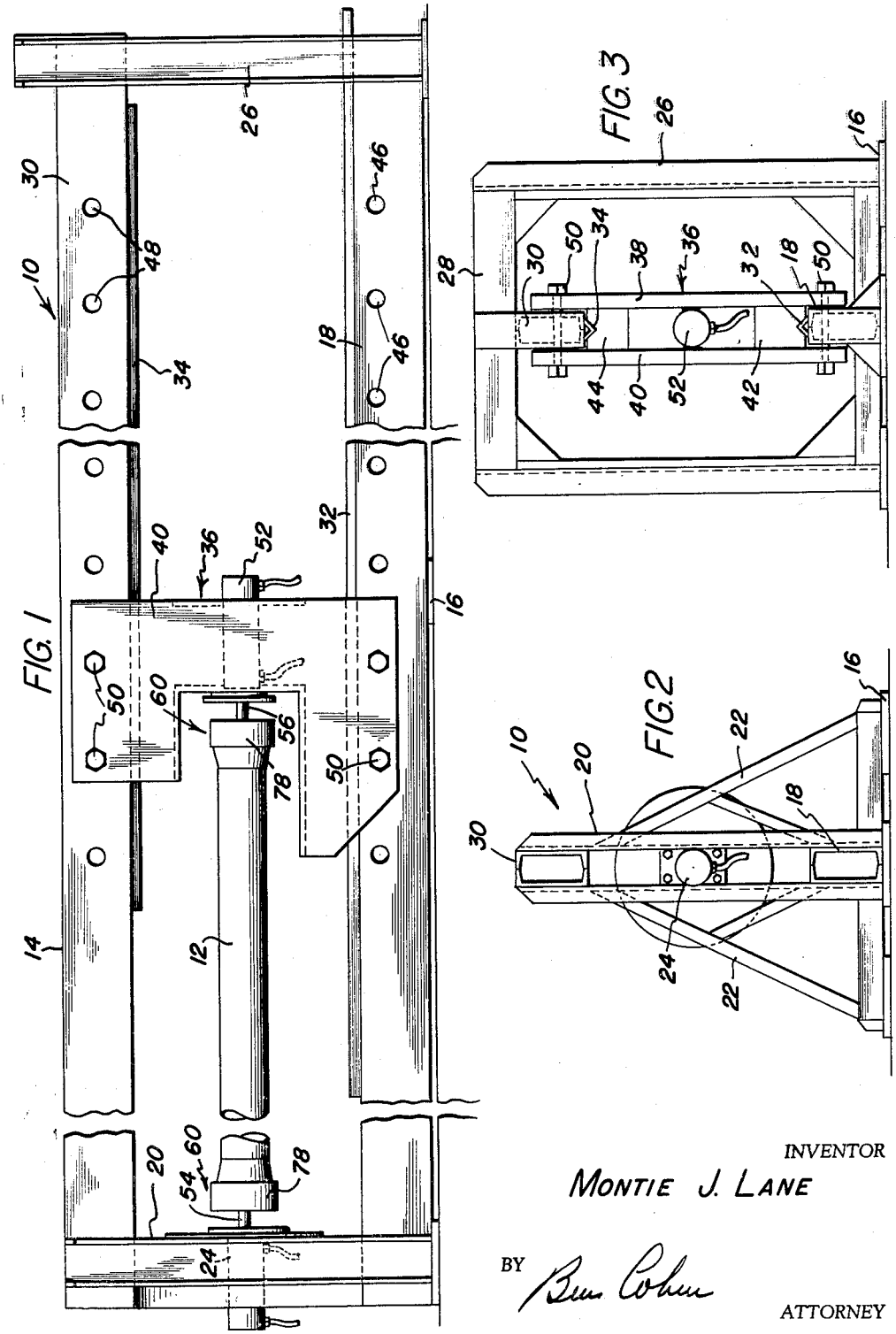

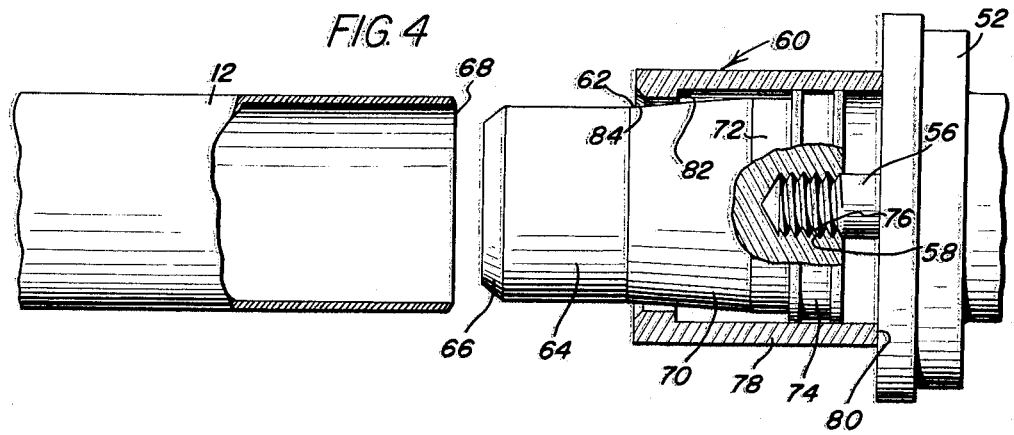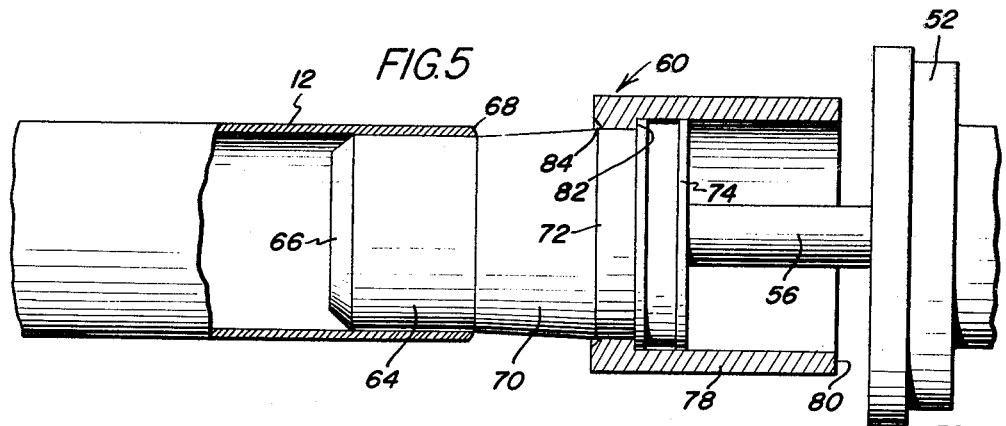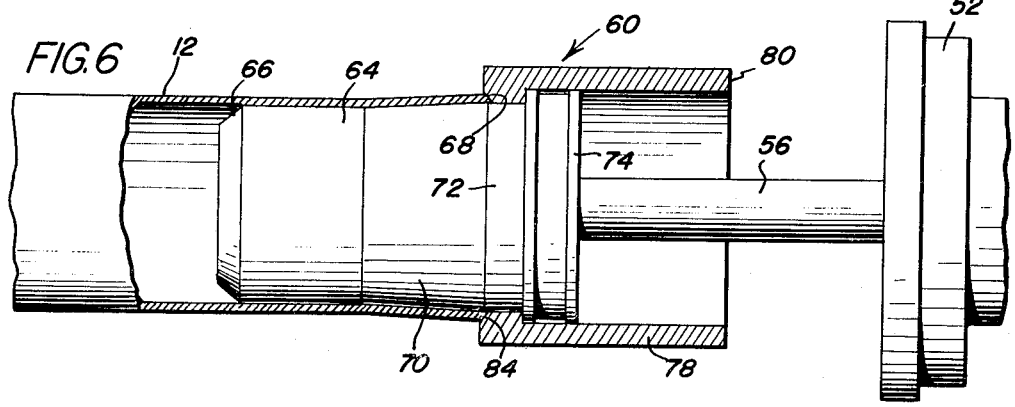

3,059,689
STRIPPER COLLAR FOR FLARING MANDRELS
Montie J. Lane, 13 Ash St., Langhorne, Pa.
Filed Dec. 24, 1958, Ser. No. 782,840
4 Claims. (Cl. 153—80.5)

This invention relates generally to the "cold forming" of pipe or conduit to provide a flared or belled pipe end to facilitate the installation of a pipe line.

When a pipe line is laid for the purpose of threading or pulling electrical cable or the like therethrough, the pipe line is generally formed of lengths of conduit having a diameter from 4–10 inches, for example, and of a considerable length, and the joints between sections of the pipe line are generally welded. Conventionally, the adjacent ends of sections of a pipe line are secured by means of a butt weld and oftentimes flashings of the weld material would penetrate beyond the bore of the pipe thus interfering with the subsequent passage of cable being drawn through the pipe, tearing or damaging the cable so as to render it unusable. In order to prevent flashings of weld material from penetrating within a pipe line a flare joint incorporating a chill ring has been utilized by the industry as well as a bell joint. The flare joint generally comprises adjacent flared ends of two adjacent sections of a pipe line which receive therein conforming portions of an annular transversely split ring which prevents weld flashings from extending within the pipe line. A weld bead is provided between the adjacent edges of the pipe line sections and an electrical cable may be drawn through the pipe line without danger of damage in the manner mentioned above. A bell joint generally comprises one end of a pipe line section being slightly flared to receive therein the undisturbed end of an adjacent pipe line section. A weld bead is provided at the edge of the flared section of pipe and weld flashings will fall on the outer surface of the section of pipe disposed within the flared end of the section of pipe receiving the undisturbed end. In the bell joint, the end of the section of pipe which is flared is generally flared sufficiently to permit the sections of pipe to be joined, to be coaxial and to have a uniform inside diameter. The inner annular edge of the section received within the flared end of the cooperating section of pipe line is generally ground off or rounded to eliminate the danger of injury to an electrical cable being drawn through the pipe line.

When pipe was flared in the past, the flaring mandrel was driven into the end to be flared by means of a suitable apparatus, however, it was difficult to accurately gage the inside diameters and the length of the flare and oftentimes the mandrel would become impacted, these conditions of course gave rise to loss of time and accompanying expense which is an appreciable consideration.

A primary object of this invention is to provide a flaring mandrel including means for stripping or facilitating the removal of the mandrel from the end of a section of pipe which has been flared.

Another object of this invention is to provide an elongated flaring mandrel in conjunction with power means for moving the mandrel longitudinally within the end of a section of pipe to be flared and a stripper collar cooperating with the flaring mandrel and power means for limiting the extent of movement of the mandrel into the end of the section of pipe being flared and permitting movement of the mandrel relative to the collar and power means whereby the mandrel may be readily removed after the pipe has been flared.

With the above objects in view, together with such additional objects and advantages as may subsequently appear, the invention will be more fully described in connection with the accompanying drawings, wherein:

FIGURE 1 is a side elevation of a pipe flaring machine in which the invention is used;

FIGURE 2 is an end view looking from left to right at FIGURE 1;

FIGURE 3 is an end view looking from right to left at FIGURE 1;

FIGURE 4 is an enlarged fragmentary view showing the end of a section of pipe to be flared, a flaring mandrel and cooperating stripper collar and motor, portions being broken away and shown in section for clarity;

FIGURE 5 is a view similar to FIGURE 4, showing the flaring mandrel partially inserted into the adjacent end of the section of pipe to be flared;

FIGURE 6 is a view similar to FIGURE 5, showing the relative position of the parts after the section of pipe has been flared;

FIGURE 7 is a view similar to FIGURES 4–6, showing the relative position of the parts with the partial removal of the flaring mandrel from the end of the section of pipe after it has been flared;

FIGURES 8 and 9 are enlarged fragmentary views similar to portions of FIGURES 4–7 showing the manner in which insert shims may be provided and incorporated in the structure to control inside diameter of flared ends by altering the length of flare in a section of pipe being flared; and FIGURE 10 is an enlarged fragmentary section showing the manner in which two adjacent flared ends of sections of pipe may be secured through the utilization of a chill ring to form a flare joint.

Referring to the drawings in detail and particularly to FIGURES 1–3, indicated generally at 10 is apparatus for flaring two ends of a section of pipe 12 which as previously mentioned may have an eight inch diameter, for example, and which may be of a forty foot length, for example. The apparatus 10 comprises a frame 14 including a base 16 including a longitudinally extending lower track 18. Extending vertically from one end of the track as seen in FIGURES 1 and 2 is a vertical support member 20 suitably braced as indicated at 22 which supports a horizontal disposed double acting fluid motor 24. Extending vertically from the other end of the track 18 is a rectangular suitably braced support frame 26 including a horizontally disposed upper member 28 from which depends one end of an upper track 30. The other end of the track 30, as seen in FIGURE 2, is suitably secured to the upper end of the support 20. The tracks 18 and 30 are disposed in horizontal coplanar relationship. The tracks 18 and 30 include elongated bearing portions 32 and 34, respectively, which support thereon a longitudinally adjustable vertically disposed carriage indicated generally at 36. The carriage 36 comprises a pair of spaced parallel plates 38 and 40, the upper and lower ends of which being disposed at opposite sides of the tracks 18 and 30 as clearly seen in FIGURE 3, and have extending transversely therebetween suitable bearing blocks 42 and 44 cooperating with the bearings 32 and 34, respectively. The tracks 18 and 30 incorporate longitudinally spaced transverse apertures 46 and 48, respectively, cooperating with alignable apertures extending through overlying portions of the plates 38 and 40. Suitable retaining nut-and-bolt assemblies 50 are provided for securing the carriage 36 in an adjusted position depending upon the length of the section of pipe 12. The plates have suitably secured in coaxial relationship with the fluid motor 24 a double-acting fluid motor 52. The fluid motors 24 and 52 may be pneumatically or hydraulically operated, each including extendable and retractable piston rods 54 and 56, respectively, which are threaded at their terminal ends as indicated at 58, see FIGURE 4.

Further considering FIGURE 4, indicated generally at 60 is a flaring mandrel-and-stripper collar assembly, one of such assemblies being removably secured to each of the piston rods and accordingly only one will be described in detail. The assembly 60 comprises an elongated flaring mandrel 62 including a forward uniformly diametered portion 64 beveled or relieved at its forward edge 66 to facilitate entry within the end 68 of the pipe 12. The portion 64 substantially conforms to the inner diameter of the pipe 12 as seen for example, in FIGURE 5. The uniformly diametered portion 64 continues rearwardly in a frustro conical flaring portion 70 of a length sufficient to form the desired flare in the pipe 12, see FIGURE 6, the portion 70 continuing in a uniformly diametered annular land 72. The mandrel has formed on the rear end thereof an annular abutment shoulder 74. Opening into the rear end of the mandrel as seen in FIGURE 4, is an internally threaded bore 76 to be received upon the threaded terminal end of the piston rod 56. Circumposed about the abutment shoulder 74 and reciprocable relative to the mandrel is a cylindrical stripper collar 78 the rear end portion 80 of which being engageable with an adjacent portion of the fluid motor 52 when the mandrel is being stripped or removed from the pipe 12 as seen in FIGURE 7. The stripper collar 78 includes at its forward end an inwardly extending annular abutment shoulder 82 engageable with the abutment shoulder 74 of the mandrel as seen in FIGURES 5 and 6 during the movement of the mandrel into the pipe 12. The forward inner edge of the shoulder 82 is beveled at 84 to engage the beveled edge of the pipe 12 as seen in FIGURES 6 and 7.

Considering FIGURES 4-7, when it is desired to flare the end of the pipe 12 the parts are initially in the positions shown in FIGURE 4. The fluid motors are operated to extend the mandrels within the ends of the pipe 12, portions 64 and 66 of the mandrels facilitating the entry thereof into the pipe. As the mandrel moves into the pipe the abutment shoulders 74 of the mandrels will engage the abutment shoulder 82 of the stripper collar and the collar will move with the mandrel toward the pipe. When the portion 84 of the stripper collar engages the end 68 of the pipe, further entry of the mandrel into the pipe will be prevented and the end of the pipe will be flared to conform with the frustro conical portion 70 of the mandrel. Inasmuch as the aforementioned function comprises "cold forming" of the pipe, the mandrel will be frictionally retained within the end of the pipe which has been flared. Considering FIGURE 7 as the piston rod 56 is being retracted, the piston rod 54 may be permitted to move with the pipe 12 since the flaring mandrel-and-stripper collar assembly 60 associated therewith will also have the mandrel thereof retained within that end of the pipe section 12 which has been flared. When the end 80 of the stripper collar engages the fluid motor 52, portion 84 of the stripper collar will provide an abutment for the end 68 of the pipe and further retraction of the mandrel will facilitate ready removal of the same out of the end of the pipe. After one mandrel is removed the same procedure is utilized for the other mandrel.

Although the apparatus has been disclosed for the purpose of flaring both ends of a section of pipe, if it is desired to flare only one end of a section of pipe, one of the assemblies 60 may be replaced by a suitable mandrel which will be received on one or the other of the piston rods, this mandrel having a diameter substantially equal to the inner diameter of the pipe section 12. The assemblies 60 will be selected depending on the diameter of the pipe to be flared and dimensioned to provide in the sections of pipe 12 the desired flare which is required for a particular installation.

Considering FIGURES 8 and 9, different lengths of flare may be afforded through the utilization of annular spacer rings or shims 86 or 88, the shims being received on the portion 72 of the mandrels to be disposed between the engaging portions of the abutment shoulders 74 and 82. Thus it is possible to form different lengths of flare X or Y of a shorter length than that disclosed in FIGURES 4-7. When the short length flares are formed, the maximum diameter of the flare will be less than that afforded by complete insertion of the flaring mandrel.

Considering FIGURE 10, a typical flare joint is illustrated wherein the adjacent ends of pipe sections 90 and 92 have previously been flared as indicated at 94 and 96, respectively. Telescoped within the flared portions 94 and 96 is an annular chill ring 98 transversely split as indicated at 100 to facilitate mounting of the ends of the pipe thereon, the outer surface of the chill ring 98 having annular diverging surface portions 102 and 104 substantially conforming to the inner diameter of the tapered portions 94 and 96, respectively. The chill ring incorporates an annular rib 106, and a suitable annular weld 108 will be deposited to secure the adjacent edges of the pipe sections 90 and 92 together.

It is believed that the construction, operation and advantages of the invention will now be apparent. While a preferred embodiment has been disclosed, minor changes may be made in the details of construction as do not depart from the spirit of the invention or the scope of the appended claims.

Having thus described the invention, what is claimed is:

1. For use in pipe flaring apparatus, an elongated flaring mandrel, power means secured to one end of said mandrel for forcibly moving the same longitudinally into the end of a hollow member to be flared, and a stripper collar reciprocably mounted on said mandrel and having free relative longitudinal movement thereon, cooperating means on said collar and mandrel limiting relative movement of said collar in one direction for determining the length of the flare to be formed when the mandrel is extended into the hollow member, said collar including a portion abuttingly engageable with said power means for permitting movement of said mandrel relative to said collar when the mandrel is withdrawn from the hollow member.

2. The structure claim 1 including means insertable between said cooperating means for adjusting the amount of relative movement between said collar and mandrel to determine the length and diameter of the flare to be formed.

3. The structure of claim 1 in which said mandrel comprises a tapered portion at one end for forming the inner dimension of the flare to be formed, said power means comprising a fluid motor including an extendable and retractable force transmitting rod secured to said mandrel, said cooperating means comprising radially extending abutment means at said other end of said mandrel and at an adjacent end of said collar.

4. The structure of claim 3 including means insertable between said cooperating means for adjusting the amount of relative movement between said collar and mandrel to determine the length and diameter of the flare to be formed.

References Cited in the file of this patent

UNITED STATES PATENTS

| Re. 24,441 | Parker et al. | Mar. 4, 1958 |
| 409,994 | Matheson | Aug. 24, 1889 |
| 2,383,330 | Michael | Aug. 21, 1945 |
| 2,419,724 | Millard et al. | Apr. 29, 1947 |
| 2,506,657 | Welster | May 9, 1950 |
| 2,929,131 | McCloskey | Mar. 22, 1960 |